US006803077B2

(12) United States Patent
Yu

(10) Patent No.: US 6,803,077 B2
(45) Date of Patent: Oct. 12, 2004

(54) METHOD FOR PREPARING MESOPOROUS $TiO_2$ THIN FILMS WITH HIGH PHOTOCATALYTIC AND ANTIBACTERIAL ACTIVITIES

(75) Inventor: Chai-Mei Jimmy Yu, Hong Kong (CN)

(73) Assignee: Insight Intellectual Property Limited, Beijing (CN)

(*) Notice: Subject to any disclaimer, the term of this patent is extended or adjusted under 35 U.S.C. 154(b) by 0 days.

(21) Appl. No.: 10/427,710

(22) Filed: Apr. 30, 2003

(65) Prior Publication Data

US 2003/0235653 A1 Dec. 25, 2003

(30) Foreign Application Priority Data

Apr. 30, 2002 (CN) ......................................... 02119304 A

(51) Int. Cl.[7] .............................. B05D 3/02; B05D 1/18
(52) U.S. Cl. ............................... 427/376.2; 427/376.1; 427/430.1; 427/443.2
(58) Field of Search ........................... 427/430.1, 443.2, 427/376.1, 376.2

(56) References Cited

U.S. PATENT DOCUMENTS 5,718,878 A * 2/1998 Zhang ......................... 423/610

6,387,453 B1 * 5/2002 Brinker et al. ............... 427/387
6,592,980 B1 * 7/2003 MacDougall et al. ..... 428/304.4

FOREIGN PATENT DOCUMENTS

| CN | 1312337 A | 12/2001 |
|----|-----------|---------|
| CN | 1342517 A | 3/2002 |
| CN | 1342517 * | 4/2002 |
| CN | 1400186 A | 5/2003 |

OTHER PUBLICATIONS

Derwent abstract of CN 1342517 by Tan et al., published Apr. 3, 2002.*
International Search Report for the PCT International application No. PCT/CN03/00319, dated Aug. 7, 2003.

* cited by examiner

Primary Examiner—Michael Barr
(74) Attorney, Agent, or Firm—McAndrews, Held & Malloy, Ltd.

(57) ABSTRACT

The present invention provides a method for preparing mesoporous $TiO_2$ thin films with high antibacterial and photocatalytic activities. The method involves coating onto a substrate a $TiO_2$ sol-gel prepared from hydrolysis and condensation of titanium alkoxide in the presence of a stabilizer and thermally treating the substrate at a temperature ranging from 400° C. to 900° C. The $TiO_2$ thin films fabricated according to the method of the present invention show two times higher antibacterial and photocatalytic activities than the conventional $TiO_2$ thin films.

40 Claims, 3 Drawing Sheets

METHOD FOR PREPARING MESOPOROUS TIO₂ THIN FILMS WITH HIGH PHOTOCATALYTIC AND ANTIBACTERIAL ACTIVITIES

CROSS-REFERENCE TO RELATED APPLICATIONS

Priority is claimed from Chinese application Serial No. CN02119304.5 filed Apr. 30, 2002. The entire specification and all the claims of this application are hereby incorporated by reference.

FIELD OF THE INVENTION

The present invention relates to a method for preparing mesoporous $TiO_2$ thin films with high photocatalytic and antibacterial activities, and to use of the mesoporous $TiO_2$ thin films as described in sterilizing and purifying seawater, tap water and water coming from other sources.

TECHNICAL BACKGROUND OF THE INVENTION

In the food industry and medical field, sterilization is always an important issue. Bacteria and viruses not only come from piscinas, kitchens and operation rooms of the hospital, but also can be derived from many other places. Once they adapt themselves the environment, they will propagate in a significantly vital speed. Recently, many kinds of bacteria such as *E-coli,* comma bacillus, and protoblast with viruses have been found in the fish tank water (for live seafood) of some restaurants in Hong Kong. This kind of contamination is harmful to human health.

A solution for this problem is to use the $TiO_2$ photocatalysis technology. However, the application of powdered $TiO_2$ as a photocatalyst for killing bacteria and viruses has the drawback of post-separation in a slurry system after photoreaction. Therefore, great efforts have been made to immobilize photocatalyst $TiO_2$ on different substrates such as glass, stainless steel and ceramic. Conventional methods for the preparation of a $TiO_2$ thin film on a substrate include chemical vapor deposition, magnetic spraying and pyrolysis. Although these methods can produce $TiO_2$ thin films on solid substrates, these $TiO_2$ films exhibit very poor photocatalytic and antibacterial activities because of poor crystallinity, small surface area and low anatase content.

The inventor has developed a method for preparing $TiO_2$ thin films by a modified sol-gel method. This method has many significant advantages including: 1) it does not require special apparatus; 2) it allows simultaneous doping of transition metal ions to $TiO_2$; 3) it facilitates the optimization of $TiO_2$ phase constitution; 4) it can control the porous structure, specific surface area and surface hydroxyl groups using an organic template containing a polymer or a surfactant.

It is known that the photocatalytic and antibacterial activities of a $TiO_2$ thin film are significantly influenced by its phase constitution, specific surface area, porous size and distribution, and surface hydroxyl groups. Therefore, the invention is hereby provided.

SUMMARY OF THE INVENTION

The invention provides a simple and efficient method for preparing a mesoporous $TiO_2$ thin film with high photocatalytic and antibacterial activities. The $TiO_2$ thin film prepared by this method can be used to photo-catalytically kill bacteria and viruses in aqueous solutions. This invention is particularly useful for fish tank water disinfection.

Mesoporous materials have a pore size in the range of 2 to 50 nm. These materials can be in different forms such as spherical, thin film, block, and fiber. Materials with pore size of less than 2nm are called microporous materials, and large than 50 nm are classified as macroporous materials.

The method according to the invention for preparing a photocatalytic mesoporous $TiO_2$ thin film involves the utilization of a $TiO_2$ sol-gel solution prepared by controlled hydrolysis and condensation of a titanium alkoxide in the presence of a stabilizer. Specifically, the method of the present invention includes the following steps of: a) producing a $TiO_2$ sol-gel by hydrolysis-condensation of titanium alkoxide in a solution in the presence of a stabilizer; b) coating the $TiO_2$ sol-gel on a substrate; and c) thermally treating the $TiO_2$ gel-coated substrate at a temperature ranging from 400° C. to 800° C.

The stabilizer used in the invention acts as a complexing agent to react with titanium alkoxide. Suitable stabilizers include triethanolamine, diethanolamine, acetyl acetone, diethylene glycol, acetic acid, trifluoroacetic acid, and a combination of two or more of them. One or a combination of two stabilizers is preferable. The $TiO_2$ sol-gel solutions can effectively produce a $TiO_2$ thin film on a substrate even after being stored for more than two months.

Except for specific indication, the term of "titanium alkoxide(s)" used herein means titanic acid ester(s). In the invention, it is preferably one or more selected from titanium butoxide, titanium isopropoxide and titanium ethoxide, more preferably one or a combination of two compounds.

The molar ratio of the stabilizer and titanium alkoxide used in the invention may be 0.05–3:1, preferably 1–1.5:1. Molar concentration of the used titanium alkoxide in the solution may be 0.01–3M, preferably 0.3–1M.

In the invention, the titanium alkoxide solution may comprise one or more solvents such as ethanol, isopropanol and propanol, besides water, and isopropanol or propanol or a mixture of both is preferably used as the solvent.

Materials such as glass, quartz glass, borosilicate glass, soda-lime glass pre-coated with a $SiO_2$ film, stainless steel and ceramic can be used as substrates for the $TiO_2$ thin film coating.

In order to form desired mesoporous $TiO_2$ films, it is preferable to add a template during the preparation of the $TiO_2$ sol-gel to aid the formation of the desired mesoporous $TiO_2$ films. The template used in the invention may be certain polymers or surfactants.

A typical polymer used as a template in the invention is an amphipathic three-block copolymer such as polyoxyethylene ether (PEO)-polyoxypropenyl ether (PPO)-polyoxyethylene ether (PEO) ((HO)CH$_2$CH$_2$)x(CH$_2$CH(CH$_3$)Oy(CH$_2$CH$_2$O)zH, P123, product of Aldrich, USA) with an average molecular weight of 1,000–10,000. In the invention, P123 with an average molecular weight of 3,300–5,800 is preferable. The porous size and size distribution can be controlled by adjusting the molecular weight and the amount of the used polymer. In general, the amount of the polymer used as a template in the $TiO_2$ sol-gel solution may be 5–35% by weight, preferably 9–20% by weight.

Surfactants used as templates in the invention may include cetyltrimethyl ammonium bromide, cetyltrimethyl ammonium chloride, dodecyltrimethyl ammonium bromide, and a combination thereof. The amount added may preferably account for 10–15% by weight in the $TiO_2$ sol-gel solution.

TiO$_2$ thin films may be thermally treated at a temperature ranging a temperature from 400° C. to 800° C. for 0.5–4 hours. Preferably, the thin film is calcined at a temperature ranging from 500° C. to 700° C. for 1–2 hours.

According to the invention, the procedure for the formation of the TiO$_2$ sol-gel solution can be divided into the following three steps: 1) dissolving a titanium alkoxide in an organic solvent; 2) adding a stabilizer to the above solution with continuous agitation; and 3) controlling hydrolysis and condensation of the titanium alkoxide by adding an excess of water.

The invention also provides a mesoporous TiO$_2$ thin film having high photocatalytic and antibacterial activities prepared according to the method of the invention.

The invention still provides use of the mesoporous TiO$_2$ thin film described herein in sterilizing and purifying water of the fish tank, seawater, and tap water or water from other sources.

To produce a good affinity between the TiO$_2$ thin film and substrate, the surface of the substrate has to be pre-treated. The TiO$_2$ gel film is coated onto a substrate by a dip coating technique (1. R. Reisfeld and C. K. Jorgensen, 77 Structure and Bonding: Chemistry, Spectroscopy and Applications of Sol-Gel Glass, Springer-Verlag, 1992, Berlin, pp91–95; 2. C. I. Brinker and G. W. Scherer, Sol-Gel Science, Academic Press, 1990, San Diego, pp788). Generally, the withdrawal speed can be controlled at 1–6 mm/s. The TiO$_2$ gel film formed on a substrate is dried at around 100° C. for 10–60 mins, and then calcined at 400–800° C. for 0.5–4 hours to obtain the desired mesoporous TiO$_2$ thin films.

The photo-induced antibacterial activity of the TiO$_2$ thin film is evaluated by the inactivation of *E-coli*, on the basis of the decrease in the colony number of *E-coli* formed on agar plate. The results show that the antibacterial activity of the mesoporous TiO$_2$ thin film is twice as much as that of an ordinary thin film. This enhanced anti-bacterial activity can be attributed to a larger specific surface area and more surface hydroxyl groups of the mesoporous TiO$_2$ thin film.

The procedure for antibacterial activity measurement is briefly described below. A total of 1 mL of the *E-coli*. cell suspension with initial cell concentration of $1 \times 10^6$ CFU/ml. is pipetted onto the TiO$_2$ thin film coated glass. The glass is illuminated by a 15 W long wavelength UV lamp (Cole-Parmer Instrument Co.) positioned 3 cm above the thin film. The light intensity striking TiO$_2$ thin film is $1000 \pm 30 \mu W/cm^2$, as measured by an UV meter with the peak intensity at 365 nm (model UVX digital radiometer; UVP Inc., San Gabriel, Calif.). The 20 or 40 $\mu l$ aliquots of serially diluted suspensions are plated on soy agar plates at 20 or 40 min intervals. The plates are then incubated at 30° C. for 24 h, and the number of colonies on the plates is counted.

The photocatalytic activity of the TiO$_2$ thin film is evaluated by the degradation of acetone in air (J. C. Yu, J. G. Yu, J.C. Zhao, Enhanced Photocatalytic Activity of Mesoporous and Ordinary TiO$_2$ Thin Films by Sulfuric Acid Treatment, Applied Catalysis B: Environmental, 2002, 36:31–43). The experimental results show that the photocatalytic activity of the TiO$_2$ thin film prepared according to the invention is twice as high as that of an ordinary thin film. The reason is that the mesoporous TiO$_2$ thin film possesses a larger specific surface area and a higher porosity, which provides more active sites for acetone and allows faster release of the degradation products such as CO$_2$ and H$_2$O from the catalyst. The detailed experimental method is described below. The photocatalytic activity experiments on the TiO$_2$ thin film on glass for the oxidation of acetone in air are performed at ambient temperature using a 7000 ml reactor. The area of TiO$_2$ thin film used for each experiment is 140 cm$^2$. The initial concentration of acetone after the adsorption equilibrium is 400±5 ppm, which remains constant until a 15 W 365 nm UV lamp (Cole-Parmer Instrument Co.) in the reactor is switched on. The initial concentration of water vapor is 1.20±0.01 vol %, and the initial temperature is 25±1° C. The analysis of acetone, carbon dioxide, and water vapor concentration in the reactor is conducted with a Photoacoustic IR Multigas Monitor (INNOVA Air Tech Instruments Model 1312).

The ordinary and mesoporous TiO$_2$ thin films are also characterized with by X-ray photoelectron spectroscopy (XPS), atomic force microscopy (AFM), transmission electron microscopy (TEM), X-ray diffraction (XRD), BET surface area and UV-VIS spectrophotometry, respectively.

As stated above, the mesoporous TiO$_2$ thin film exhibits higher photocatalytic and antibacterial activities than an ordinary TiO$_2$ thin film does.

This can be attributed to the fact that the mesoporous TiO$_2$ thin film has a larger specific surface area, a higher porosity and more surface hydroxyl groups.

DESCRIPTION OF THE INVENTION

Figure 1A:
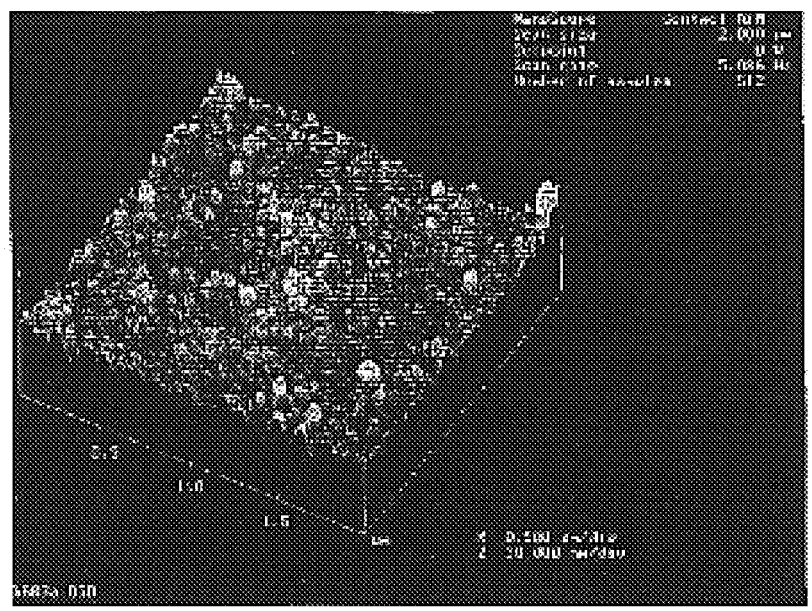
FIG. 1*a* is a 3D AFM image of a mesoporous TiO$_2$ thin film prepared according to the invention.

The invention will be further described in conjunction with the following examples, but not intended to limit the scope of protection sought in the application.

EXAMPLE 1
Preparation of Mesoporous TiO$_2$ Thin Films

10–50 g of copolymer PEO-PPO-PEO (P123, average molecular weight 4,400) was dissolved in 150.0 ml of anhydrous ethanol. The solution was stirred for 1 hour. To the solution was added titanium isopropoxide (28.4 ml) and acetyl acetone (10.0 ml). Resultant solution was stirred for 2 hours. Water (1.8 ml) was added to the solution, and the solution was stirred for 1 hour to allow formation of a stable, homogenous and transparent sol-gel solution in light orange. The composition of prepared TiO$_2$ sol-gel solution was shown in Table 1.

The TiO$_2$ thin film on a quartz glass was prepared by dip coating in the above TiO$_2$ sol-gel solution. The withdrawal speed was controlled at 6 mm/s. The film coated on the quartz glass was dried at 100° C. for 60 minutes, then calcined in a muffle roaster at 500° C. for 1 hour before cooled to the room temperature to obtain mesoporous TiO$_2$ thin films with different porous sizes and various distributions of the porous sizes.

The physical parameters of the prepared mesoporous TiO$_2$ thin film on a quartz glass are shown in Table 2. The amount of the template (P123) used for the formation of the mesoporous TiO$_2$ thin film is 20 g.

Preparation of Ordinary $TiO_2$ Thin Films

Titanium isopropoxide (28.4 g) and triethanolamine (14.9 g) were dissolved in 140ml of anhydrous ethanol, respectively. After the solution was stirred for 1 hour, a mixed solution of 1.8 g of water and 10 ml of anhydrous ethanol was added. Resultant solution was kept stirring for another 2 hours to produce a light orange $TiO_2$ sol-gel solution in which the molar ratio of titanium isopropoxide, anhydrous ethanol, triethanolamine and water is 1:26.5:1:1. This ordinary $TiO_2$ thin film was prepared in the same manner as used for the mesoporous one. Films with different thickness were prepared by repeating the above procedure.

Figure 1B:
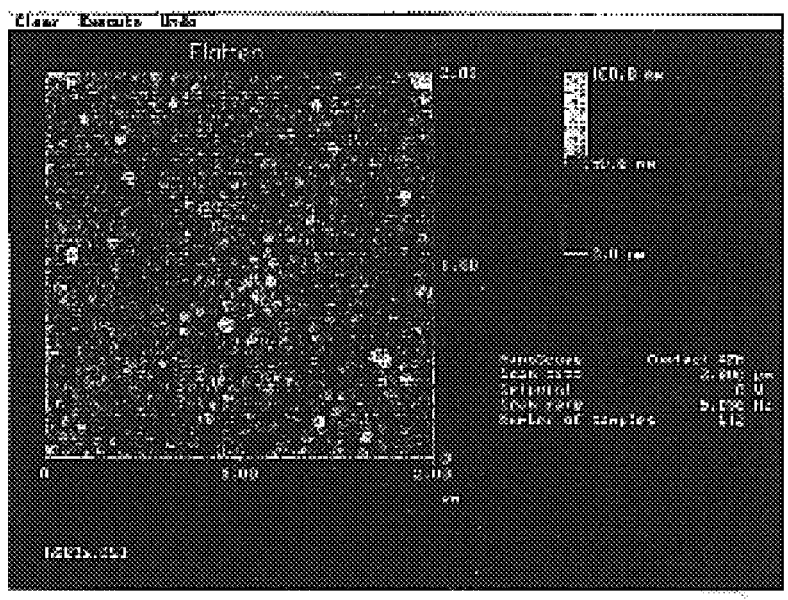
FIG. 1*b* is a 2D AFM image of a mesoporous TiO$_2$ thin film according to the invention.
Figure 1C:
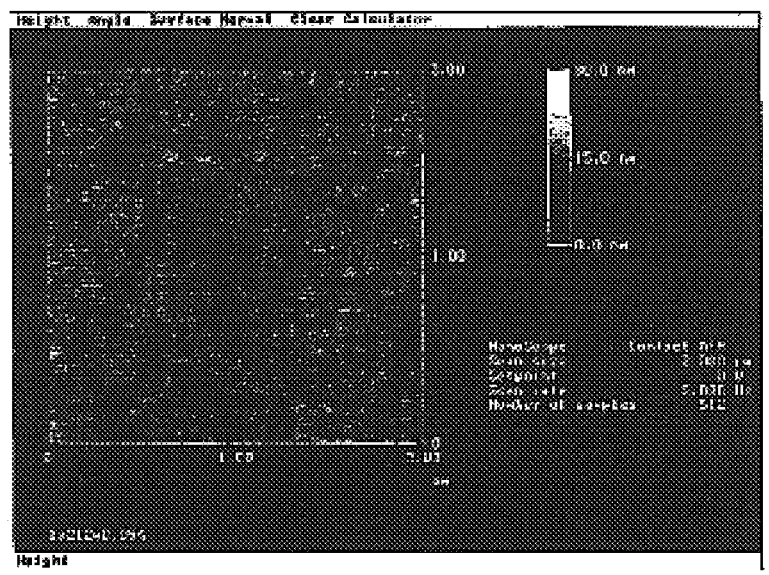
FIG. 1*c* is a 2D AFM image of an ordinary TiO$_2$ thin film.
Figure 1D:
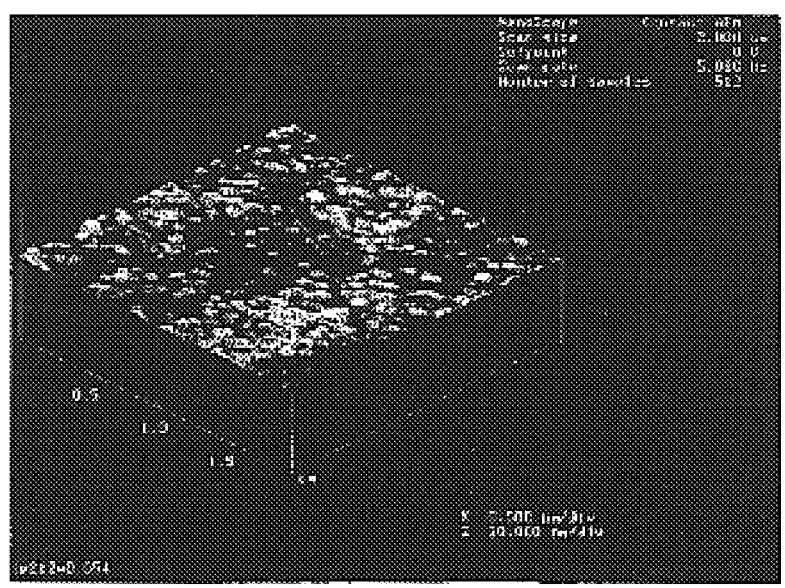
FIG. 1*d* is a 3D AFM image of an ordinary TiO$_2$ thin film.
Figure 2:
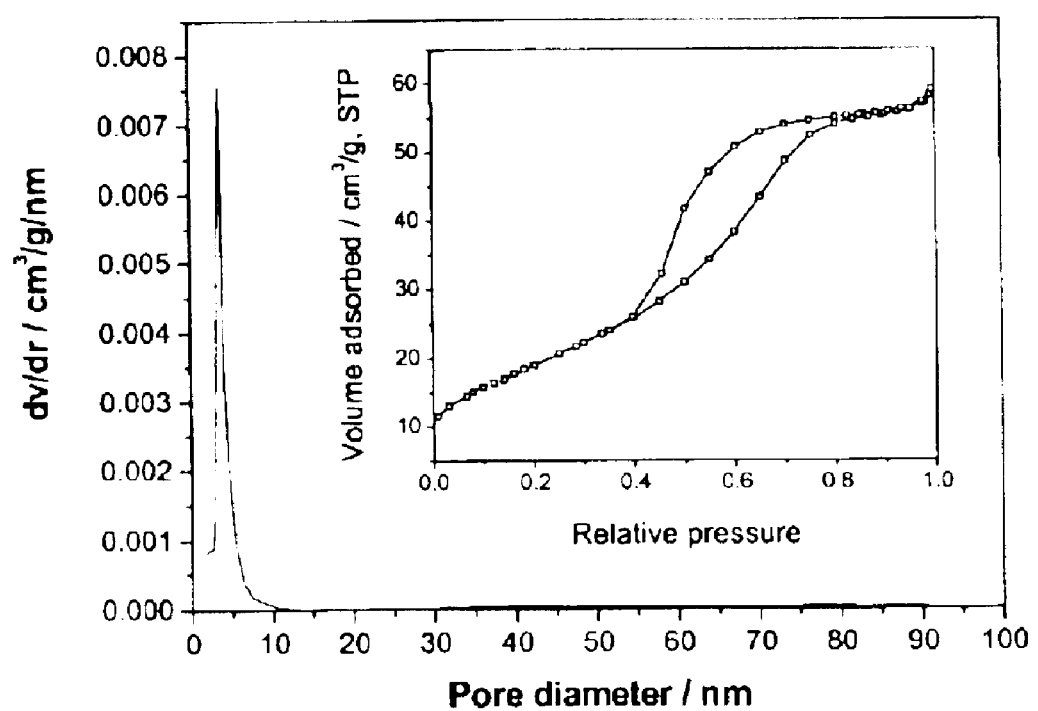
FIG. 2 shows isothermal graphs of adsorption and desorption, and distribution (BJH substrated on the isothermal graph of desorption) of the porous size of the mesoporous TiO$_2$ thin films according to the invention.

The physical parameters, specific surface area, porous volume and size, and photocatalytic and antibacterial activities of the mesoporous and ordinary $TiO_2$ thin film are displayed in Table 2, 3, 4 and 5, respectively. The surface morphologies of both thin films are shown in FIGS. 1a–1d.

TABLE 1

Composition of the Sol-Gel Solution Used for Preparing Mesoporous $TiO_2$ Thin Films

| Sample | Isopropyl Titanante (ml) | Diacetone (ml) | $H_2O$ (ml) | Anhydrous Ethanol (ml) | P123 (g) |
|---|---|---|---|---|---|
| M10 | 28.4 | 28.4 | 1.8 | 150 | 10 |
| M20 | 28.4 | 28.4 | 1.8 | 150 | 20 |
| M30 | 28.4 | 28.4 | 1.8 | 150 | 30 |
| M40 | 28.4 | 28.4 | 1.8 | 150 | 40 |
| M50 | 28.4 | 28.4 | 1.8 | 150 | 50 |

TABLE 2

Some Physical Parameters of a Mesoporous $TiO_2$ Thin Film and an Ordinary $TiO_2$ Thin Film

| Thin Film | Thickness ($\mu$m) | Phase Constitution | Crystal Size (nm) | Surface Roughness (Rrms, nm) | Surface .OH Content (%) |
|---|---|---|---|---|---|
| Mesoporous | 0.15 | 100% Anatase | 12.3 | 1.53 | 11.3 |
| Ordinary | 0.18 | 100% Anatase | 13.9 | 0.56 | 8.7 |

TABLE 3

Specific Surface Areas and Porous Parameters of Mesoporous $TiO_2$ Thin Films and Ordinary $TiO_2$ Thin Films Thermally Treated at Different Temperatures

| Temperature °C. | Specific Surface Area ($m^2g^{-1}$) | Porosity (%) | Porous Volume (mlg$^{-1}$) | Average Porous Size (nm) | Porous Size Range (nm) |
|---|---|---|---|---|---|
| Mesoporous 500 | 69.9 | 24.6 | 0.088 | 5.04 | 2.7–6.2 |
| Mesoporous 700 | 10.5 | 10.6 | 0.032 | 12.2 | 3.1–16.4 |
| Mesoporous 900 | 2.7 | 3.2 | 0.009 | 37.3 | 10.5–101.2 |
| Ordinary 500 | 9.1 | 9.8 | 0.029 | 6.5 | 3–60 |
| Ordinary 700 | 2.3 | 2.3 | 0.008 | 21.0 | 20–80 |
| Ordinary 900 | The specific surface area and other porous parameters cannot be precisely determined by nitrogen desorption method due to its too small specific surface area (less than 1). | | | | |

TABLE 4

Comparison of Photocatalytic Activity between a Mesoporous and an Ordinary $TiO_2$ Thin Film

| Sample | Film Thickness[a] ($\mu$m) | Mass (mg) | Degradation Rate[b] (%) | Speed (min$^{-1}$) | Specific Photocatalytic Activity[c] (mol/g h) |
|---|---|---|---|---|---|
| Mesoporous | 0.15 | 7.4 | 7.9 | $1.2 \times 10^{-3}$ | $3.7 \times 10^{-3}$ |
| Ordinary | 0.18 | 8.8 | 4.8 | $7.6 \times 10^{-4}$ | $1.9 \times 10^{-3}$ |

[a]Area of Thin films used for photocatalytic reaction: 140 cm$^2$; Coating cycle: once.
[b]Average degradation of acetone after the photocatalytic reaction undergoes for 1 hour.
[c]Degraded acetone amount after photocatalytic reaction undergoes for 1 hour.

TABLE 5

Comparison of Antibacterial Activity between a Mesoporous and an Ordinary $TiO_2$ Thin Film

| UV Irradiation Time (min) | 0 | 10 | 20 | 40 |
|---|---|---|---|---|
| E-coli. Survival (%) On a Glass without $TiO_2$ thin film | 100 | 109 | 94 | 94 |
| E-coli. Survival (%) On Ordinary $TiO_2$ Thin Film | 100 | 96 | 96 | 17 |
| E-coli. Survival (%) On Mesoporous $TiO_2$ Thin Film | 100 | 55 | 47 | 0 |

EXAMPLE 2

Mesoporous $TiO_2$ thin films were prepared in the same manner as in Example 1 with the exception of calcination temperature. In this Example, the $TiO_2$ thin film was calcined at 300° C., 700° C. and 900° C. for 1 hour in the muffle roaster, respectively. Effects of the calcination temperature on the surface area and other physical properties of the mesoporous $TiO_2$ thin film are shown in Table 3 and Table 8, respectively. As shown in Table 8, mesoporous $TiO_2$ thin films calcined at the temperature ranging from 500° C. to 700° C. show higher photocatalytic activities, and the mesoporous $TiO_2$ thin film calcined at 700° C. shows the highest photocatalytic activity. This is primarily because the mesoporous $TiO_2$ thin film calcined at 700° C. is composed of both the anatase and rutile phases. In general, $TiO_2$ photocatalyst consisting of such two phases favors the separation of photo-generated electron and hole to enhance photoctalystic activity (See the reference: J.G. Yu, J. C. Yu, W. K. Ho, Z. T. Jiang, Effects of Calcinations Temperature on the Photocatalytic Activity and Photo-Induced Super-Hydrophilicity of Mesoporous $TiO_2$ Thin Films, New Journal of Chemistry, 2002, 36: 607–613). However, the mesoporous $TiO_2$ thin films calcined at 300° C. and 900° C. are composed of an amorphous phase and a rutile phase, respectively. Mesoporous $TiO_2$ thin film composed of the amorphous phase or the rutile phase generally has poor photocatalytic activity.

TABLE 7

Effect of Calcination Temperature on Physical Parameters of Mesoporous TiO$_2$ Thin Film

| Calcination Temperature (° C.) | Thickness$^a$ ($\mu$m) | Phase Constitution | Crystal Size (nm) | Surface Roughness (Rrms, nm) | Surface .OH Content (%) |
|---|---|---|---|---|---|
| 300 | 0.18 | Amorphous | 12.3 | 1.16 | 22.3 |
| 500 | 0.15 | Anatase: 100% | 13.9 | 1.53 | 11.3 |
| 700 | 0.13 | Anatase: 77% Rutile: 23% | A: 33.6 B: 50.6 | 2.47 | 10.6 |
| 900 | 0.12 | Rutile: 100% | 13.9 | 4.53 | 6.3 |

Substrate: quartz glass; Coating cycle: one; Calcination Time: 1 hr.

TABLE 8

Effect of Calcination Temperature on Photocatalytic Activity of Mesoporous TiO$_2$ Thin Film

| Calcination Temperature (° C.) | Film Thickness$^a$ ($\mu$m) | Film Weight (mg) | Degradation Rate$^b$ (%) | Degradation Rate Constant (min$^{-1}$) | Specific Photocatalytic Activity$^c$ (mol/g h) |
|---|---|---|---|---|---|
| 300 | 0.18 | 10.3 | To be ignored$^d$ | | |
| 500 | 0.15 | 7.4 | 7.9 | 1.2 × 10$^{-3}$ | 3.7 × 10$^{-3}$ |
| 700 | 0.13 | 7.4 | 8.8 | 1.4 × 10$^{-3}$ | 4.1 × 10$^{-3}$ |
| 900 | 0.12 | 7.4 | To be ignored$^d$ | | |

$^a$Area of the Films used for Photocatalytic reaction: 140 cm$^2$; Coating cycle: one.
$^b$Average degradation of acetone after the photocatalytic reaction proceeds for 1 hour.
$^c$Moles of acetone degraded per gram of the photocatalyst in 1 hour.
$^d$No change in acetone concentration after UV irradiation for one hour

EXAMPLE 3

A mesoporous TiO$_2$ thin film coated on the inner surface of a glass container for fish was prepared in the same manner as in Example 1. An ultraviolet lamp with lower power was set inside the glass container. Water injected from the bottom of the glass container was allowed to contact UV irradiated mesoporous TiO$_2$ thin film. The concentrations of *E-coli* and comma bacillus in water before and after photocatalytic treatment were shown in Table 9.

TABLE 9

Antibacterial Result of Mesoporous TiO$_2$ Thin Film

| | Before Photocatalytic Treatment (CFU/100 ml) | After Photocatalytic Treatment (CUF/100 ml) | Removal Rate (%) |
|---|---|---|---|
| *E-coli* | 380,000,000 | 160,000 | 100 |
| Comma *bacillus* | 1900 | 0 | 100 |

From Table 9, more than 99% of *E-coli* and comma bacillus were killed shortly with the mesoporous TiO$_2$ thin film under UV illumination. This example evidences that the mesoporous TiO$_2$ thin film is an efficient photocatalyst for killing bacteria and viruses in water.

EXAMPLE 4

Using the same experimental methods as in Example 3, it was found that the mesoporous TiO$_2$ thin film can also be used to photocatalytically kill the bacteria in seawater, tap water and water from other sources.

EXAMPLE 5

Mesoporous TiO$_2$ thin films on ordinary glass, borosilicate glass, SiO$_2$-precoated soda-lime glass and ceramics were prepared using the same method as in Example 1 except that ordinary glass, borosilicate glass, SiO$_2$-precoated soda-lime glass and ceramic were used instead of quartz glass as the substrate. The anti-bacterial activity measurement results show the mesoporous TiO$_2$ thin films on these substrates are also photocatalytically active like that on a quartz glass.

The above examples and descriptions are only used to fully illustrate the invention, but not intended to limit thereto. Modifications and varieties to the invention without departing from the spirit of the invention that are obvious for those skilled in the art will fall within the scope of the appended claims.

What is claimed is:

1. A method for preparing a mesoporous TiO$_2$ film having photocatalytic and antibacterial activities comprising the steps of:
   a) producing a TiO$_2$ sol-gel;
   b) coating the TiO$_2$ sol-gel onto a substrate; and
   c) treating said coated substrate at a temperature ranging from 400° C. to 800° C.,
   wherein said TiO$_2$ sol-gel is prepared by hydrolysis-condensation of titanium alkoxide in a solution in the presence of a stabilizer and a template,
   and wherein the template is an amphipathic three-block copolymer.

2. A method of claim 1, wherein said titanium alkoxide is selected from the group consisting of titanium butoxide, titanium isopropoxide, titanium ethoxide, and a combination thereof.

3. A method of claim 2, wherein said titanium alkoxide has a molar concentration of 0.01–3M in the solution.

4. A method of claim 3, wherein said titanium alkoxide has a molar concentration of 0.3–1M in the solution.

5. A method of claim 1, wherein said stabilizer is selected from the group consisting of triethanolamine, diethanolamine, acetyl acetone, diethylene glycol, acetic acid, trifluoroacetic acid, and a combination thereof.

6. A method of claim 5, wherein said stabilizer and said titanium alkoxide are used at a molar ratio of 0.05–3:1.

7. A method of claim 2, wherein said stabilizer is selected from the group consisting of triethanolamine, diethanolamine, acetyl acetone, diethylene glycol, acetic acid, trifluoroacetic acid, and a combination thereof.

8. A method of claim 3, wherein said stabilizer is selected from the group consisting of triethanolamine, diethanolamine, acetyl acetone, diethylene glycol, acetic acid, trifluoroacetic acid, and a combination thereof.

9. A method of claim 4, wherein said stabilizer is selected from the group consisting of triethanolamine, diethanolamine, acetyl acetone, diethylene glycol, acetic acid, trifluoroacetic acid, and a combination thereof.

10. A method of claim 7, wherein said stabilizer and said titanium alkoxide are used at a molar ratio of 0.05–3:1.

11. A method of claim 8, wherein said stabilizer and said titanium alkoxide are used at a molar ratio of 0.05–3:1.

12. A method of claim 9, wherein said stabilizer and said titanium alkoxide are used at a molar ratio of 0.05–3:1.

13. A method of claim 1, wherein said solution comprises one or more solvents selected from the group consisting of ethanol, propanol, and isopropanol.

14. A method of claim 2, wherein said solution comprises one or more solvents selected from the group consisting of ethanol, propanol, and isopropanol.

15. A method of claim 3, wherein said solution comprises one or more solvents selected from the group consisting of ethanol, propanol, and isopropanol.

16. A method of claim 4, wherein said solution comprises one or more solvents selected from the group consisting of ethanol, propanol, and isopropanol.

17. A method of claim 5, wherein said solution comprises one or more solvents selected from the group consisting of ethanol, propanol, and isopropanol.

18. A method of claim 6, wherein said solution comprises one or more solvents selected from the group consisting of ethanol, propanol, and isopropanol.

19. A method of claim 7, wherein said solution comprises one or more solvents selected from the group consisting of ethanol, propanol, and isopropanol.

20. A method of claim 8, wherein said solution comprises one or more solvents selected from the group consisting of ethanol, propanol, and isopropanol.

21. A method of claim 9, wherein said solution comprises one or more solvents selected from the group consisting of ethanol, propanol, and isopropanol.

22. A method of claim 10, wherein said solution comprises one or more solvents selected from the group consisting of ethanol, propanol, and isopropanol.

23. A method of claim 11, wherein said solution comprises one or more solvents selected from the group consisting of ethanol, propanol, and isopropanol.

24. A method of claim 12, wherein said solution comprises one or more solvents selected from the group consisting of ethanol, propanol, and isopropanol.

25. A method of claim 1, wherein said amphipathic three-block copolymer is polyoxyethylene ether (PEO)-polyoxypropenyl ether (PPO)-polyoxyethylene ether (PEO) having an average molecular weight of 1,000–10,000, accounting for 5–35% in the sol-gel.

26. A method of claim 25, wherein said amphipathic three-block copolymer has an average molecular weight of 3,300–5,800 and accounts for 9–20% in the sol-gel.

27. A method of claim 1, wherein said step c) is conducted at a temperature ranging from 500° C. to 700° C.

28. A method of claim 25, wherein said step c) is conducted at a temperature ranging from 500° C. to 700° C.

29. A method of claim 26, wherein said step c) is conducted at a temperature ranging from 500° C. to 700° C.

30. A method of claim 1, wherein the step b) is conducted by the dip coating.

31. A method of claim 25, wherein the step b) is conducted by the dip coating.

32. A method of claim 26, wherein the step b) is conducted by the dip coating.

33. A method of claim 27, wherein the step b) is conducted by the dip coating.

34. A method of claim 28, wherein the step b) is conducted by the dip coating.

35. A method of claim 29, wherein the step b) is conducted by the dip coating.

36. A method of claim 1, wherein said substrate includes ordinary glass, borosilicate glass, $SiO_2$-precoated soda-lime glass and ceramics.

37. A method of claim 26, wherein said substrate includes ordinary glass, borosilicate glass, $SiO_2$-precoated soda-lime glass and ceramics.

38. A method of claim 29, wherein said substrate includes ordinary glass, borosilicate glass, $SiO_2$-precoated soda-lime glass and ceramics.

39. A method of claim 35, wherein said substrate includes ordinary glass, borosilicate glass, $SiO_2$-precoated soda-lime glass and ceramics.

40. A mesoporous $TiO_2$ film having photocatalytic and antibacterial activities prepared according to claim 1.

* * * * *

UNITED STATES PATENT AND TRADEMARK OFFICE
CERTIFICATE OF CORRECTION

PATENT NO. : 6,803,077 B2
DATED : October 12, 2004
INVENTOR(S) : Chai-Mei Jimmy Yu It is certified that error appears in the above-identified patent and that said Letters Patent is hereby corrected as shown below:

Title page,
Item [73], Assignee, change "Insight Intellectual Property Limited" to
-- The Chinese University of Hong Kong --.

Signed and Sealed this

Twenty-second Day of March, 2005

JON W. DUDAS
*Director of the United States Patent and Trademark Office*